United States Patent [19]

Sczomak

[11] Patent Number: 4,905,908
[45] Date of Patent: Mar. 6, 1990

[54] POPPET COVERED ORIFICE FUEL INJECTION NOZZLE

[75] Inventor: David P. Sczomak, Troy, Mich.

[73] Assignee: General Motors Corporation, Detroit, Mich.

[21] Appl. No.: 258,887

[22] Filed: Oct. 17, 1988

[51] Int. Cl.[4] .................. B05B 1/32; F02M 61/10
[52] U.S. Cl. .................... 239/533.12; 239/452
[58] Field of Search .................. 239/452–455, 239/460, 533.3–533.12

[56] References Cited

U.S. PATENT DOCUMENTS

| | | |
|---|---|---|
| 1,342,486 | 6/1920 | Wolfard . |
| 1,898,325 | 2/1933 | Venn ........................ 239/453 |
| 2,035,203 | 3/1936 | Smith . |
| 2,063,709 | 12/1936 | Taylor ...................... 239/458 |
| 2,096,814 | 10/1937 | Laessker . |
| 2,295,081 | 9/1942 | Harvath . |
| 2,521,224 | 9/1950 | Kammer . |
| 2,592,111 | 4/1952 | Bischof . |
| 2,762,654 | 9/1956 | Purchas et al. . |
| 2,901,185 | 8/1959 | Dickey ..................... 239/453 |
| 3,982,693 | 9/1976 | Hulsing ...................... 239/88 |
| 4,034,917 | 7/1977 | Bailey ........................ 239/453 |
| 4,082,224 | 4/1978 | Mangus ...................... 239/453 |
| 4,096,995 | 6/1978 | Klomp ......................... 239/94 |
| 4,153,200 | 5/1979 | Fenne ......................... 239/94 |
| 4,269,360 | 5/1981 | Kopse ........................ 239/533.9 |
| 4,285,471 | 8/1981 | Eblen et al. ................. 239/533.4 |
| 4,509,691 | 4/1986 | Shinner ...................... 239/533.9 |
| 4,516,729 | 5/1985 | Fussner et al. ............... 239/453 |
| 4,662,338 | 5/1987 | Itoh .......................... 123/467 |
| 4,693,424 | 9/1987 | Sczomak ...................... 239/453 |
| 4,750,675 | 6/1988 | Sczomak ...................... 239/453 |

FOREIGN PATENT DOCUMENTS

| | | |
|---|---|---|
| 79037 | 7/1950 | Czechoslovakia . |
| 802968 | 7/1949 | Fed. Rep. of Germany . |
| 2542727 | 3/1977 | Fed. Rep. of Germany . |
| 827877 | 5/1938 | France . |
| 2289756 | 10/1975 | France . |
| 542371 | 4/1941 | United Kingdom . |
| 1521065 | 8/1978 | United Kingdom . |
| 2111124 | 6/1983 | United Kingdom ........... 239/453 |

Primary Examiner—Andres Kashnikow
Assistant Examiner—Kevin P. Weldon
Attorney, Agent, or Firm—Karl F. Barr, Jr.

[57] ABSTRACT

In a fuel injection nozzle having an outwardly opening poppet valve that controls the delivery of fuel to an engine combustion chamber, a piston stages the operation of the nozzle to provide a low rate of injection during light load engine operation, and a high rate of injection during heavy load engine operation. This improved nozzle thus enhances the ability of the engine to operate with low noise, hydrocarbon and nitrogen oxide emissions.

4 Claims, 2 Drawing Sheets

POPPET COVERED ORIFICE FUEL INJECTION NOZZLE

TECHNICAL FIELD

This invention relates to a nozzle for delivering fuel to the combustion chamber of an internal combustion engine.

Background

In a fuel injection system for a direct injection engine, a pump supplies a measured amount of fuel to a nozzle for delivery directly into the engine combustion chamber.

U.S. Pat. No. 4,693,424 issued Sept. 15, 1987 in the name of D. P. Sczomak describes a fuel injection nozzle having an outwardly opening poppet valve that controls delivery of fuel to the engine combustion chamber. That nozzle allows the engine to operate with lower noise, hydrocarbon and nitrogen oxide emissions than engines with other nozzles.

U.S. Pat. No. 4,750,675 issued June 14, 1988 in the name of D. P. Sczomak describes an improved fuel injection nozzle also having an outwardly opening poppet valve that controls delivery of fuel to the engine combustion chamber. That improved nozzle includes a piston that dampens opening movement of the poppet valve, thereby reducing the initial rate of injection and thus enhancing the ability of the engine to operate with low noise, hydrocarbon and nitrogen oxide emissions.

SUMMARY OF THE INVENTION

This invention provides a further improved fuel injection nozzle also having an outwardly opening poppet valve that controls the delivery of fuel to the engine combustion chamber.

In the improved nozzle provided by this invention, a piston stages the operation of the nozzle to provide a low rate of injection during light load engine operation, and a high rate of injection during heavy load engine operation. This improved nozzle further enhances the ability of the engine to operate with low noise, hydrocarbon and nitrogen oxide emissions.

The details as well as other features and advantages of two embodiments of this improved nozzle are set forth in the remainder of the specification and are shown in the drawings.

THE PREFERRED EMBODIMENTS

Figure 1:
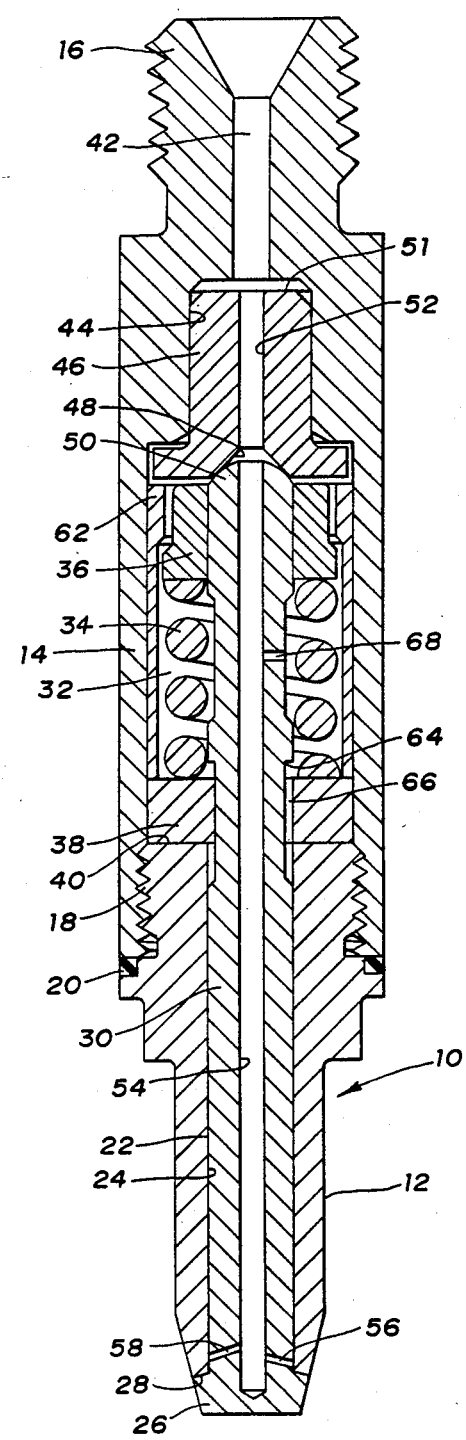
FIG. 1 is an axial sectional view of one embodiment of this improved nozzle, showing the construction of the nozzle.
Figure 2:
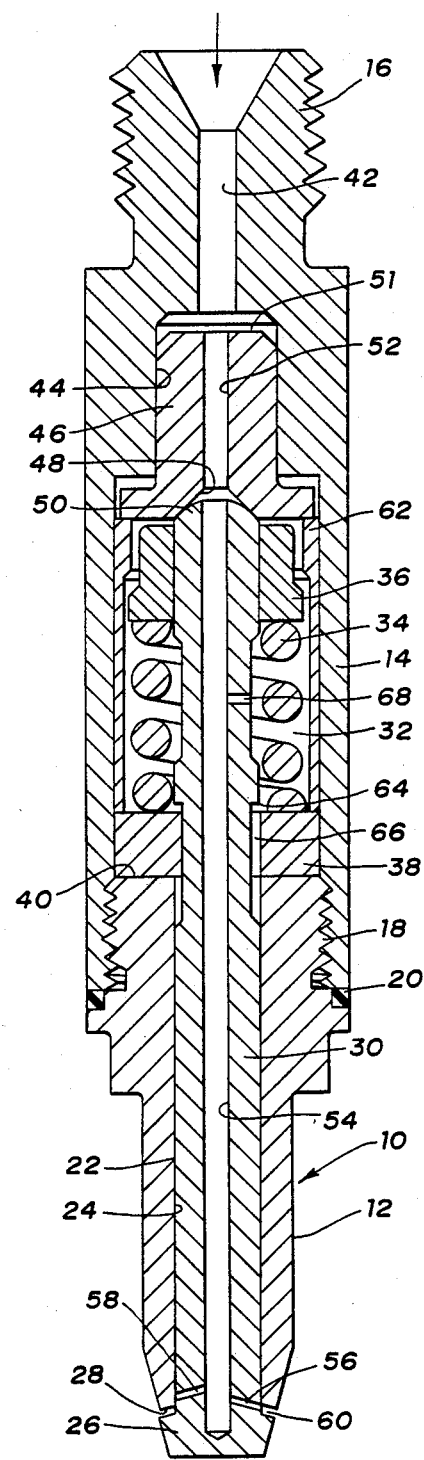
FIG. 2 is a view similar to FIG. 1, showing the position of the parts when the poppet valve is partially open.
Figure 3:
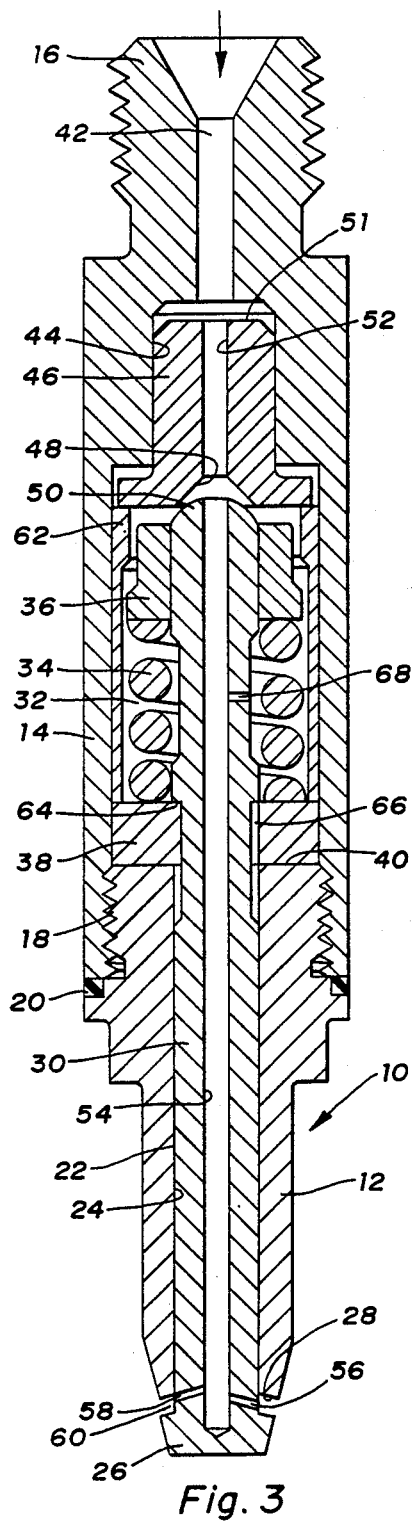
FIG. 3 is a view similar to FIG. 1, showing the position of the parts when the poppet valve is fully open.

Referring first to FIGS. 1–3, a nozzle 10 has a body 12 adapted to be received in an engine cylinder head, and a holder 14 having a fitting 16 that receives fuel from an injection pump. Body 12 and holder 14 are threaded together at 18, and a gasket 20 seals the threaded connection.

A poppet valve 22 is received in the bore 24 of body 12. Valve 22 has a head 26 that engages the bottom 28 of body 12, and a stem 30 that extends into the chamber 32 formed between body 12 and holder 14. Within chamber 32, a spring 34 is compressed between a spring retainer 36 secured around stem 30 and a stop member 38 that rests against the top 40 of body 12.

Holder 14 has a fuel inlet passage 42 that opens into a bore 44. An actuating piston 46 is lapped fit in bore 44. Piston 46 has an inner shoulder 48 that seals against the perimeter of the upper face 50 of stem 30.

When the injection pump supplies fuel to nozzle 10, the injection pressure of the fuel acts on the upper face 51 of piston 46. Piston 46 transfers the resulting opening force to stem 30 to displace poppet valve 22 against the bias of spring 34. Fuel then flows through inlet passage 42, the passage 52 in piston 46, and the passage 54 in stem 30 to lower and upper sets of orifices 56 and 58, and is discharged across the gap 60 (FIGS. 2–3) between poppet valve head 26 and the lower end 28 of body 12.

An extended stop 62 engages and prevents further travel of piston 46 when poppet valve 22 has been displaced only far enough to expose the lower set of orifices 56 below the lower end 28 of body 12. By using only the orifices 56 to deliver fuel to the engine combustion chamber during light load engine operation, the rate of injection is reduced and the ability of the engine to operate with low noise, hydrocarbon and nitrogen oxide emissions is enhanced.

The injection pressure increases with load, and in response to the higher injection pressures of heavy load engine operation, the upper face 50 of stem 30 acts as a piston and further displaces poppet valve 22 until a shoulder 64 on stem 30 engages stop member 38. At that time, both sets of orifices 56 and 58 are exposed below the lower end 28 of body 12 to allow delivery of the fuel required for heavy load engine operation.

It should be noted that a clear separation is provided between the first stage in which only the lower set of orifices 56 discharge fuel, and the second stage in which both sets of orifices 56 and 58 discharge fuel. The ratio of first and second stage opening pressures is determined by the ratio of the area of face 51 of piston 46 and the area of face 50 of stem 30. By reducing the rate of injection during the first stage, the noise, hydrocarbon, and nitrogen oxide emissions are improved at heavy loads.

It will be appreciated that the same injection characteristics could be achieved by employing two springs. However, addition of a second spring would require an increase in the diameter or length of the nozzle. The improved nozzle provided by this invention does not require such an increase in length or diameter.

The opening 66 through stop member 38 is eccentric to the axis of nozzle 10, thereby allowing stop member 38 to be assembled around stem 30 and then, upon insertion into holder 14, to slide laterally under shoulder 64 to act as a stop for poppet valve 22.

Toward the end of the injection event, the rate of fuel delivery falls off, and spring 34 raises poppet valve 22 (and piston 46) to engage valve head 26 with the lower end 28 of body 12.

During the injection event, piston 46 compresses the fuel in chamber 32. To prevent hydraulic lock, a small equalizing orifice 68 is provided though stem 30 between passage 54 and chamber 32. The size of orifice 68 must be optimized—large enough to allow movement of poppet valve 22 at the desired rate, but small enough to avoid pressures in chamber 32 that could cause piston 46 to separate from stem 30 before piston 46 engages extended stop 62.

Figure 4:
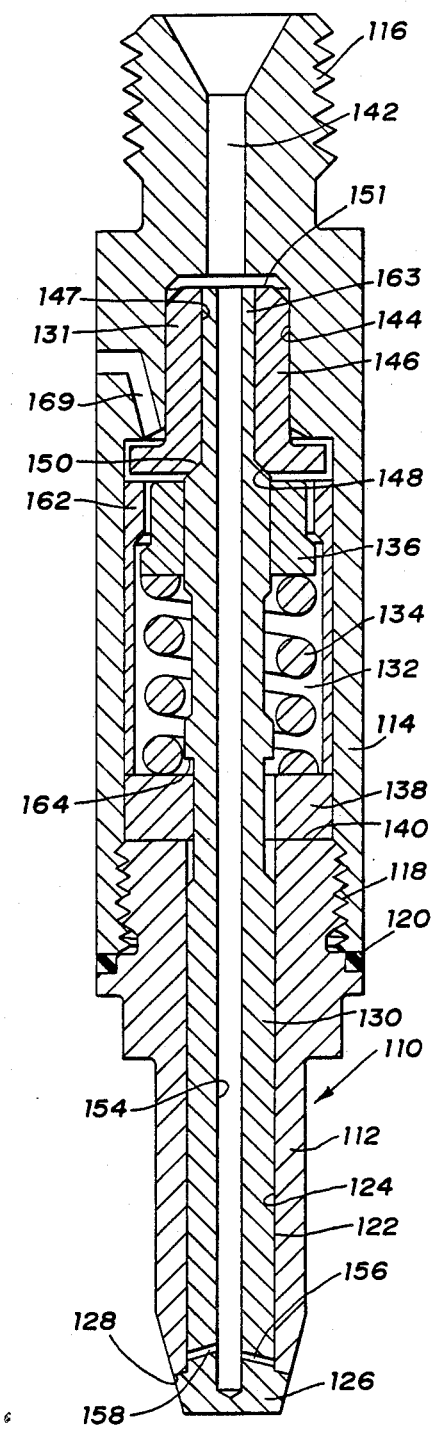
FIG. 4 is an axial sectional view of another embodiment of this improved nozzle.

Referring now to FIG. 4, a nozzle 110 has a body 112 adapted to be received in an engine cylinder head, and a holder 114 having a fitting 116 that receives fuel from an injection pump. Body 112 and holder 114 are threaded together at 118, and a gasket 120 seals the threaded connection.

A poppet valve 122 is received in the bore 124 of body 112. Valve 122 has a head 126 that engages the lower end 128 of body 112, and a stem 130 that extends into the chamber 132 formed between body 112 and holder 114. Within chamber 132, a spring 134 is compressed between a spring retainer 136 secured around stem 130 and a stop member 138 that rests against the top 140 of body 112.

Holder 114 has a fuel inlet passage 142 that opens into a bore 144. An actuating piston 146 is lapped fit in bore 144, and has an inner shoulder 148 that engages a shoulder 150 on stem 130. Stem 130 has an extension 131 that is lapped fit in a bore 147 formed in piston 146.

When the injection pump supplies fuel to nozzle 110, the injection pressure of the fuel acts on the face 151 of piston 146. Piston 146 transfers the resulting opening force to stem 130 to displace poppet valve 122 against the bias of spring 134. Fuel then flows through inlet passage 142 and the passage 154 in stem 130 to lower and upper sets of orifices 156 and 158, and is discharged across the gap between poppet valve head 126 and the lower end 128 of body 112.

An extended stop 162 engages and prevents further travel of piston 146 when poppet valve 122 has been displaced only far enough to expose the lower set of orifices 156 below the lower end 128 of body 112. By using only the orifices 156 to deliver fuel to the engine combustion chamber during light load engine operation, the rate of injection is reduced and the ability of the engine to operate with low noise, hydrocarbon and nitrogen oxide emissions is enhanced.

The injection pressure increases with load, and in response to the higher injection pressures of heavy load engine operation, the upper face 163 of stem 130 acts as a piston and further displaces poppet valve 122 until a shoulder 164 on stem 130 engages stop member 138. At that time, both sets of orifices 156 and 158 are exposed below the lower end 128 of body 112 to allow delivery of the fuel required for heavy load engine operation.

Toward the end of the injection event, the rate of fuel delivery falls off, and spring 134 raises poppet valve 122 (and piston 146) to engage valve head 126 with the lower end 128 of body 112.

This embodiment also provides a clear separation between the first stage in which only the lower set of orifices 156 discharge fuel, and the second stage in which both sets of orifices 156 and 158 discharge fuel. The ratio of first and second stage opening pressures is determined by the ratio of the area of face 151 of piston 146 and the area of face 163 of stem 130.

By reducing the initial rate of injection during the first stage, the noise, hydrocarbon, and nitrogen oxide emissions are improved also at heavy loads.

Holder 114 has a passage 169 that vents chamber 132. Chamber 132 collects any leakage past bore 147 or bore 144. Vent passage 169 prevents hydraulic lock in chamber 132.

Because this embodiment does not pressurize chamber 132 and accordingly does not create hoop stress in holder 114, the outside diameter of holder 114 may be smaller than the outside diameter of holder 14.

It will be appreciated that a separate bushing around piston 146 within holder 114 may simplify manufacture of this embodiment, and for some purposes, it may be desirable to provide a separate bushing around piston 46 within holder 14.

I claim:

1. A fuel injection nozzle comprising a body with an axial bore, a poppet valve including a stem received, in said bore and a head adapted to engage the end of said body, a spring biasing said stem to engage said valve head with the end of said body, and a holder secured to said body, said holder having a fuel inlet passage, wherein said passage opens into a piston bore formed in said holder, an actuating piston is received in said piston bore, said piston has a face exposed to the injection pressure of fuel in said inlet passage, and said piston is adapted to transfer said injection pressure to said stem to displace said poppet valve against the bias of said spring, whereby fuel flows through said inlet passage and passage means in said piston and said stem to a plurality of orifices opening though said stem from said passage means and is discharged from said orifices across a gap formed between said valve head and the end of said body, wherein a stop engages said piston so that, in response to the lower injection pressures of light load engine operation, said poppet valve is displaced only far enough to allow fuel to be discharged from a portion of said orifices, and wherein said stem has a face exposed to said injection pressure so that, in response to the higher injection pressures of heavy load engine operation, said stem responds directly to said higher injection pressures to further displace said poppet valve far enough to allow fuel to be discharged from all said orifices, whereby the rate at which fuel is discharged during light load engine operation is lower than the rate at which fuel is discharged during heavy load operation.

2. A fuel injection nozzle comprising a body with an axial bore, a poppet valve including a stem received in said bore and a head adapted to engage the end of said body, a spring biasing said stem to engage said valve head with the end of said body, a holder secured to said body, said holder having a fuel inlet passage, said stem extending into a chamber formed between said body and said holder, wherein said passage opens into a piston bore formed in said holder, an actuating piston is received in said piston bore, said piston has a face exposed to the injection pressure of fuel in said piston bore, and said piston extends into said chamber and has a shoulder adapted to seal against the end of said stem and to transfer the injection pressure of fuel in said inlet passage to said stem to displace said poppet valve against the bias of said spring, whereby fuel flows through said inlet passage and passage means in said piston and said stem to a plurality of orifices opening though said stem from said passage means and is discharged from said orifices across a gap formed between said valve head and the end of said body, wherein a stop is disposed to engage said piston so that, in response to the lower injection pressures of light load engine operation, said poppet valve is displaced only far enough to allow fuel to be discharged from a portion of said orifices, and wherein said stem has a face exposed to said injection pressure so that, in response to the higher injection pressures of heavy load engine operation, said stem responds directly to said higher injection pressures and moves away from said piston to further displace said poppet valve far enough to allow fuel to be discharged from all said orifices, whereby the rate at which fuel is discharged during light load engine operation is lower than the rate at which fuel is discharged during heavy load operation.

3. A fuel injection nozzle comprising a body with an axial bore, a poppet valve including a stem received in said bore and a head adapted to engage the end of said body, a spring biasing said stem to engage said valve head with the end of said body, a holder secured to said body, said holder having a fuel inlet passage, said stem extending into a chamber formed between said body and said holder, wherein said passage opens into a piston bore formed in said holder, an actuating piston is received in said bore, said actuating piston has an internal bore, said stem has an extension received in said internal bore, said piston has a face exposed to the injection pressure of fuel in said inlet passage, said piston has a shoulder adapted to engage a shoulder of said stem to transfer said injection pressure to said stem to displace said poppet valve against the bias of said spring, whereby fuel flows through said inlet passage and passage means in said stem to a plurality of orifices opening though said stem from said passage means and is discharged from said orifices across a gap formed between said valve head and the end of said body, wherein a stop engages said piston so that, in response to the lower injection pressures of light load engine operation, said poppet valve is displaced only far enough to allow fuel to be discharged from a portion of said orifices, and wherein said extension of said stem has a face exposed to said injection pressure so that, in response to the higher injection pressures of heavy load engine operation, said stem responds directly to said higher injection pressures to further displace said poppet valve far enough to allow fuel to be discharged from all said orifices, whereby the rate at which fuel is discharged during light load engine operation is lower than the rate at which fuel is discharged during heavy load operation.

4. The nozzle of claim 3 wherein a passage opens from said chamber whereby the pressure in said chamber is vented when said spring moves said poppet valve to engage said valve head with the end of said body.

* * * * *